United States Patent [19]

Rosen

[11] Patent Number: 4,943,103
[45] Date of Patent: Jul. 24, 1990

[54] REFLECTED GLARE-SHIELDING VEHICULAR APPARATUS

[76] Inventor: John B. Rosen, 2330 W. 27th, Eugene, Oreg. 97405

[21] Appl. No.: 412,176

[22] Filed: Sep. 25, 1989

[51] Int. Cl.$^5$ ............................................. B60J 3/00
[52] U.S. Cl. .................................. 296/97.1; 296/977; 296/152
[58] Field of Search ................... 296/97.1, 97.5, 97.7, 296/97.9, 152; 350/277, 283

[56] References Cited

U.S. PATENT DOCUMENTS

| | | |
|---|---|---|
| 1,790,333 | 1/1931 | Tubman . |
| 1,958,962 | 5/1934 | Crosby . |
| 2,070,434 | 2/1937 | Kangas ................................ 350/283 |
| 4,560,251 | 12/1985 | Mürjahn ......................... 296/152 X |
| 4,577,929 | 3/1986 | Guillen ................................ 350/283 |
| 4,703,972 | 11/1987 | Omberg . |
| 4,865,421 | 9/1989 | Lu et al. ........................... 350/283 X |

FOREIGN PATENT DOCUMENTS

| | | | |
|---|---|---|---|
| 2010006 | 9/1971 | Fed. Rep. of Germany ..... 296/97.7 |
| 2950878 | 6/1982 | Fed. Rep. of Germany ..... 296/97.7 |
| 3443488 | 6/1986 | Fed. Rep. of Germany ..... 296/97.7 |
| 682399 | 5/1930 | France ............................... 296/97.7 |
| 1403171 | 5/1965 | France ............................... 350/277 |
| 2309362 | 11/1976 | France ............................... 350/277 |
| 646057 | 9/1962 | Italy ................................... 296/97.7 |

Primary Examiner—Margaret A. Focarino
Assistant Examiner—Gary C. Hoge
Attorney, Agent, or Firm—Kolisch, Hartwell & Dickinson

[57] ABSTRACT

A shield for protecting the driver of a vehicle against reflected glare from an exterior mirror is disclosed. The shield takes the form of a planar sheet of material suitably treated to attenuate the intensity of visible light transmitted without distortion therethrough. In one embodiment, the shield is parallelogram-shaped and is equipped with diagonally opposed suction cups for positioning and detachably fastening the shield to the interior of the window. In another embodiment, the shield is trapezoid-shaped and has no integral fastening means, but its angular forward end is capturable by wedging action between a forward part of the window and an interior region of the vehicle adjacent thereto. In both embodiments, the shield is dimensioned and positionable to intercept, and thus to attenuate, only glare reflected from the exterior mirror along the line of sight between the mirror and the driver, leaving the driver's field of view unobstructed.

4 Claims, 1 Drawing Sheet

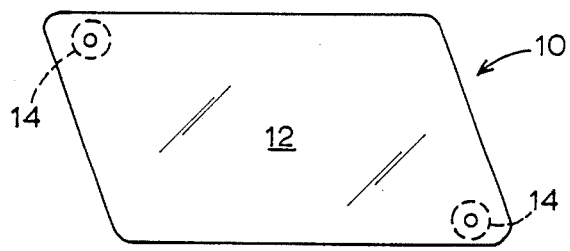
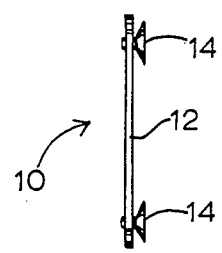
FIG.1  FIG.2
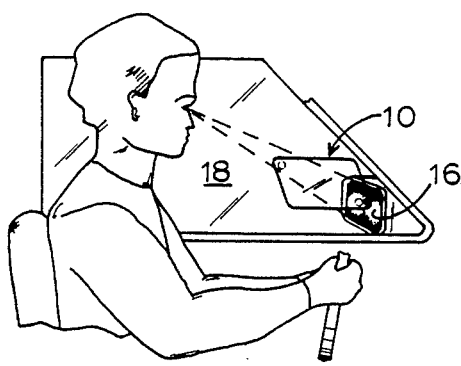
FIG.3
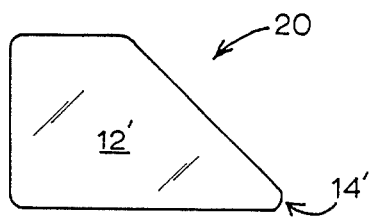
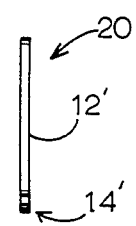
FIG.4  FIG.5
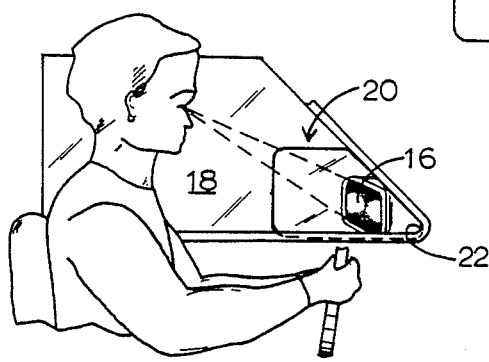
FIG.6
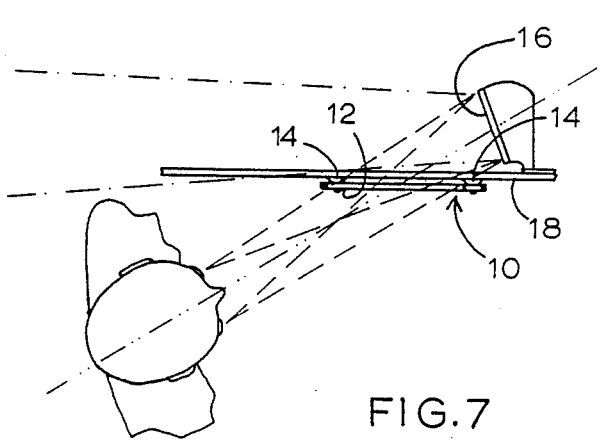
FIG.7

REFLECTED GLARE-SHIELDING VEHICULAR APPARATUS

BACKGROUND AND SUMMARY OF THE INVENTION

This invention relates generally to apparatus for shielding the driver of a vehicle from reflected light sources. More specifically, it concerns anti-glare shielding of a limited area of a vehicle's window through which backlighting is reflected from an exterior rearview mirror.

Accordingly, it is a principal object of the invention to provide an improved, small pattern glare shield that does not unnecessarily obstruct a driver's vision.

Another object is to provide a shield that is safe and effective in cutting glare under nighttime driving conditions.

It is another object of the invention to provide such a glare shield that is manually positionable and securable within the interior of a vehicle.

Another object is to provide a glare shield that conveniently may be positioned or adjusted under adverse weather conditions.

A further object is to provide a glare shield that is compatible with a wide range of vehicle sizes, makes and models.

Still another object is to provide a glare shield that is compatible with a range of driver heights, positions and preferences.

Yet another object of the invention is to provide a glare shield that is lightweight, durable and relatively inexpensive to manufacture.

These and other objects and advantages of the present invention will be more clearly understood from a consideration of the accompanying drawings and description of the preferred embodiment.

BRIEF DESCRIPTION OF THE DRAWINGS

FIG. 1 is a front elevation of the reflected glare-shielding vehicular apparatus of the invention made in accordance with its preferred embodiment.

FIG. 2 is a side elevation corresponding to FIG. 1.

FIG. 3 is a fragmentary, front elevation of the interior of a vehicle and illustrates the use of the apparatus of the invention in its preferred embodiment.

FIG. 4 is a front elevation of a modified embodiment of the invention, representing a modification to the preferred embodiment.

FIG. 5 is a side elevation of the apparatus in its modified embodiment corresponding to FIG. 4.

FIG. 6 is a fragmentary front elevation of the interior of the vehicle, and illustrates the use of the apparatus of the invention in its modified embodiment.

FIG. 7 is a top view diagram schematically representing the size and location interdependencies of the exterior mirror, the glare-shielding apparatus of the invention and the driver of a vehicle.

DETAILED DESCRIPTION OF THE PREFERRED EMBODIMENT

Referring collectively to FIGS. 1 and 2, the reflected glare-shielding apparatus of the invention in a preferred lefthand embodiment is indicated generally at 10 in front and side elevation. Apparatus 10 includes a parallelogram-shaped, generally planar, rigid expanse or shield 12 of visible light transparent material that is treated to attenuate visible glare, i.e. disturbingly intense light, that passes through it. In accordance with the preferred embodiment of the invention, expanse 12 is formed from a sheet of acrylic plastic that, prior to molding, has been color-tinted, in any well-known manner, to attenuate by a predetermined amount visible light passing therethrough. Apparatus 10 also includes means, or dual diagonally spaced suction cups, 14, connected with expanse 12 for selectively positioning expanse 12 adjacent a surface of the window of a vehicle, which means 14 further acts as means for detachably fastening expanse 12 to the Window.

FIG. 2 shows suction cups 14 and their mounting, by any suitable means, to expanse 12. Suction cups 14 have concave, suction-promoting features and are made of a resilient material, as is well-known in the art. FIG. 2 shows that expanse 12 is relatively thin compared to its height and width, thus rendering apparatus 10 lightweight. In the preferred embodiment of the invention, expanse 12 is dimensioned in height and width to have a substantially limited extent relative to the extent of the side window of a vehicle. In accordance with the preferred embodiment of the invention, the height of expanse 12 is approximately 5-inches, its width is approximately 10.5-inches and its thickness is approximately ⅛-inch. Also in accordance with the preferred embodiment, expanse 12 is shaped so that, when installed on a typically upwardly inwardly inclined side window of a vehicle, its projection in a plane normal to the driver's line of sight to an exterior mirror is generally rectangular. This conforms, or renders shape-congruent the effective shielding perimetral outline of expanse 12 with the effective glare-reflecting perimetral outline of an exterior mirror, i.e. with the shape of a field of view that is reflected by the mirror along the driver's line of sight thereto and cast on the plane of the vehicle's side window.

Turning now to FIG. 3, the use of apparatus 10 is illustrated in the context of the interior of a vehicle equipped with an exterior mirror 16. For illustration purposes, FIG. 3 depicts mirror 16 reflecting the night-time image of the glaring headlights of a vehicle that is trailing the partially illustrated vehicle. Apparatus 10 is shown in use manually, selectively positioned and detachably fastened by suction cups 14 to an interior surface of a driver's side window 18. Importantly, apparatus 10 is adjustably, fixably positionable along a line of sight between the driver of the vehicle and exterior mirror 16, thereby substantially to intercept light reflected by mirror 16 that defines a reflected field of view of the driver, indicated by dashed lines in FIG. 3. Thus, glare-attenuating apparatus 10 shields the driver from glare reflected from exterior mirror 16.

Importantly, by its dimensioning and positioning relative to exterior mirror 16, apparatus 10 extends over only a substantially limited area relative to the extent of window 18. Thus, it leaves unattenuated, indeed entirely unaffected, light within the lateral field of view of the driver of the vehicle that derives from sources other than mirror 16. It may be seen from FIG. 3 that the driver's field of view is unobstructed, i.e. the driver still can see out window 18 over its entire surface area. The driver also may see the reflected image in exterior mirror 16. What the driver cannot see is the dangerous glare that frequently accompanies nighttime driving, when a trailing vehicle's headlights shine in the eyes of a driver of a leading vehicle, by reflection off of the exterior mirror. In the relatively small pattern field of view that is subtended by expanse 12 of apparatus 10, there is no distortion. Instead, there is desirable attenuation of the intensity of light transmitted without undesirable distortion therethrough. Thus, the driver enjoys the best of both worlds: unobstructed lateral vision, and a glare-free rear view.

It would be possible to provide a large pattern glare shield for the side window of a vehicle. But such is deemed unsafe because it unnecessarily and undesirably attenuates the light intensity over a substantial portion of the driver's lateral field of view. This is especially hazardous during nighttime driving, when contrast is already extremely low. It is desirable instead to permit the driver as wide as possible a lateral field of view the light intensity of which is unattenuated. This permits, for example, the driver to see and avoid hitting a pedestrian whose light-absorbing clothing otherwise would render the pedestrian virtually invisible and significantly at risk. Thus, the advantage of the reflected glare-shielding apparatus of the invention is that its small pattern dimensioning, compared to the lateral field of view of the driver of a vehicle, and its selective positioning in the driver's line of sight to an exterior mirror of the vehicle, enable it to intercept (and attenuate) harmful rays but to leave unaffected beneficial rays of light.

It might seem, because the exterior mirror and the driver's side window are in fixed relationship to one another on a given make and model of vehicle, that apparatus 10 might be permanently, fixedly positioned adjacent exterior mirror 16. Unfortunately, this would not accommodate drivers of various heights, positions within the vehicle, or preferences. The first two variables, driver height and position within the vehicle, alter the driver's line of sight to exterior mirror 16, and thus are best accommodated by selectively positionable glare-shielding apparatus. The last of these variables, driver preference, allows that certain drivers may not always wish to have their glare-shielding apparatus deployed. This preference is accommodated by making glare-shielding apparatus 10 detachably fastenable in a convenient location within the interior of the vehicle, e.g. an interior surface of window 18.

Referring collectively to FIGS. 4 and 5, a modified embodiment of the invention is indicated generally at 20. The similarities between the apparatus in its preferred and modified embodiments are many, and similar features therebetween are indicated by primed reference designator numerals. Thus, expanse 12', while being of a different size (preferably approximately 9-inches by 12-inches) and shape (preferably trapezoidal) from expanse 12, nevertheless is similarly formed and treated, as by color-tinting, to attenuate the intensity of light passing therethrough. The main difference between apparatus 20 and apparatus 10 is the positioning-fastening means, which in the modified embodiment of the invention takes the form of an angularly shaped forward extent of expanse 20 that generally conforms to a forward corner of a vehicle's side window. Another difference is that apparatus 20 has a larger pattern than does apparatus 10, a difference in scale not evident in FIGS. 4 and 5, but clear from FIG. 6.

FIG. 6 shows the cooperation, effected by wedging action, between positioning-fastening means 14' and a region 22 of the vehicle adjacent the interior surface of window 18. As in the preferred embodiment of the invention, apparatus 20 may be manually, selectively positioned and detachably captured between and window 18 and region 22, along the line of sight between the driver of the vehicle and exterior mirror 16, by such wedging action. Thus, apparatus 20, like apparatus 10, safely shields the driver's eyes from reflected glare, yet provides the driver with an unobstructed field of view.

Turning finally to FIG. 7, the important spatial interdependencies among the driver, the glare shielding apparatus, the side window and the exterior mirror are schematically illustrated. The apparatus of the invention is shown in its preferred embodiment, although it will be understood that the following discussion relates as well to the spatial interdependencies involving the apparatus in its modified embodiment. Shown in top view in FIG. 7 are a driver a vehicle whose head is turned slightly toward exterior mirror 16. The driver's reflected field of view is indicated by a pair of dashed lines emanating from each of the driver's eyes. A rear field of view that is directly incident upon exterior mirror 16, and consequently visible therein by the driver of the vehicle, is indicated by dash-dot-lines. A so called line of sight between the driver of the vehicle and the vehicle's exterior mirror 16 is indicated by a dash-dot-dot line generally centrally located between the pairs of dashed lines defining the driver's reflected field of view. As may be seen from FIG. 7, the driver's reflected field of view has an extent that is insubstantial relative to the driver's direct visual field, or field of view, the range of which is typically almost 180°.

Apparatus 10 is shown selectively positioned along such line of sight between the driver and exterior mirror 16 at a predetermined distance from the latter, and is detachably fastened to side window 18 by suction cups 14. Expanse 12 of apparatus 10 may be seen substantially to intercept the driver's reflected field of view and thus substantially to attenuate line-of-sight reflected glare from mirror 16, by its selective positioning at such predetermined distance from mirror 16, e.g on an interior surface of window 18. It will be understood by those of skill in the art that apparatus 10 may be slightly oversized, relative to the driver's reflected field of view, thereby to accommodate normal movement over a range of distances, during operation of the vehicle, by the driver for whom apparatus 10 has been properly positioned. This avoids the hazardous prospect that, should the driver shift her weight within the vehicle or move her head slightly, reflected glare from exterior mirror 16 would momentarily blind her. Nevertheless, when properly shaped, dimensioned and positioned, apparatus 10 does not substantially affect light from sources other than mirror 16 that are within a driver's direct field of view.

Those skilled in the art will appreciate that various modifications to the disclosed embodiments may be made that are within the spirit of the invention. For example, apparatus 10, 20 readily may be adapted for use on the passenger's side of a vehicle equipped with dual exterior mirrors. Expanses 12, 12' may assume other shapes and sizes, while effectively shielding the driver's eyes from reflected glare and leaving unobstructed the driver's field of view. Expanses 12, 12' may be rendered effective in shielding a driver's eyes from reflected glare by any suitable process. And positioning-connecting means 14, 14' may take any one of a number of forms that render apparatus 10 easily deployed and stowed. It also will be appreciated by those skilled in the art that the glare-attenuating shield may take the form of a flexible, transparent, light-attenuating expanse having positioning-fastening means for detachably fastening the expanse to the surface of the exterior mirror, although such apparatus does not provide the convenience of being easily deployed under adverse weather conditions.

Accordingly, while the preferred embodiment of the invention and a modification thereto have been described herein, it is appreciated that further modifications are possible that come within the scope of the invention.

It is claimed and desired to secure by Letters Patent:

1. For use adjacent a window of a vehicle equipped with an exterior mirror having a defined perimetral outline defining a reflected field of view wherein the reflected field of view defines on the window a perimetral outline, reflected glare-shielding apparatus comprising:

a generally planar expanse of visible light transparent material treated to attenuate visible light passing therethrough, said expanse being of substantially limited extent relative to the extent of the window of a vehicle, said expanse being dimensioned substantially to intercept such reflected field of view, said expanse being shaped substantially to conform to such perimetral outline on the window, thereby to shield the driver's eyes from glare reflected from an exterior mirror while leaving substantially unaffected the driver's direct field of view, and means connected with said expanse for selectively positioning said expanse adjacent the window of the vehicle along a line of sight from the driver of the vehicle to the exterior mirror in the predetermined orientation.

2. The apparatus of claim 1, wherein said positioning means further acts as means for detachably fastening said expanse to a surface of the window.

3. Apparatus for shielding the eyes of a driver of vehicle from glare reflected from an exterior mirror of the vehicle in a reflected field of view along a line of sight between the driver and the mirror, wherein the reflected field of view defines a perimetral outline on a vehicle window, the apparatus comprising:

a reflected glare-attenuating expanse positionable along such line of sight, said expanse being substantially coextensive and shape-congruent with the perimetral outline on the vehicle window of the reflected field of view at a predetermined distance from the mirror and in a predetermined orientation relative thereto, and 4. For use with an exterior mirror having a defined first perimetral outline that casts, on a side window of a vehicle in a driver's line of sight to the mirror, a reflected field of view defining a second perimetral outline which is a projection of the first perimetral outline of the mirror on the side window, reflected glare shielding vehicular apparatus comprising:

an expanse of visible light transparent material treated to attenuate visible light passing therethrough, said expanse being shaped to be substantially congruent with the second perimetral outline of such reflected field of view, thereby substantially to shield the driver's eyes from glare reflected from the mirror while substantially leaving unaffected the driver's direct field of view through the side window and means connected with said expanse for fixably positioning the same along a line of sight from the driver of the vehicle to the exterior mirror.

* * * * *

UNITED STATES PATENT AND TRADEMARK OFFICE
CERTIFICATE OF CORRECTION

PATENT NO.  : 4,943,103
DATED       : July 24, 1990
INVENTOR(S) : John B. Rosen

It is certified that error appears in the above-identified patent and that said Letters Patent is hereby corrected as shown below:

In claim 3, column 6, between lines 16 and 17, insert the following paragraph:

--means connected with said expanse for fixably positioning said expanse at such predetermined distance and in the predetermined orientation, thereby substantially to attenuate glare from the mirror that is reflected along such line of sight and substantially not to affect light from other sources within the driver's direct field of view.--

Signed and Sealed this

Twenty-seventh Day of August, 1991

Attest:

HARRY F. MANBECK, JR.

Attesting Officer

Commissioner of Patents and Trademarks